(No Model.)
P. J. DAMES.
MACHINE FOR CUTTING VEGETABLES.
No. 291,305.  Patented Jan. 1, 1884.
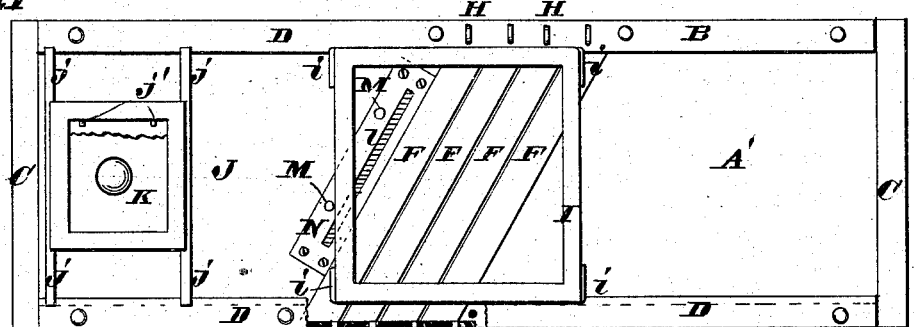
Fig. 1
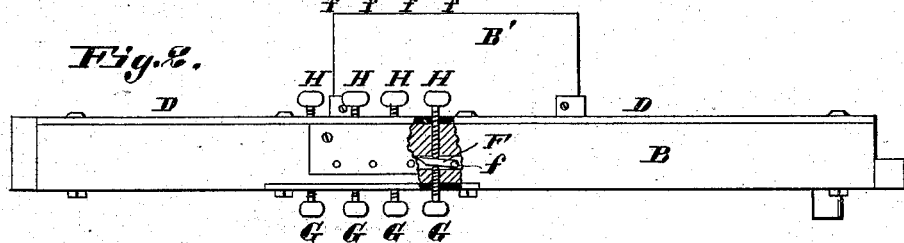
Fig. 2
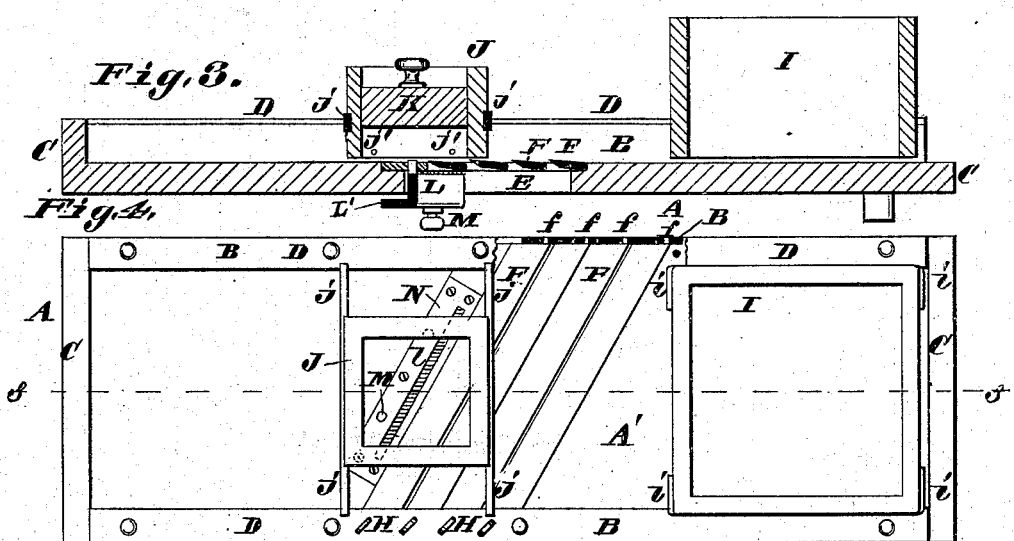
Fig. 3
Fig. 4
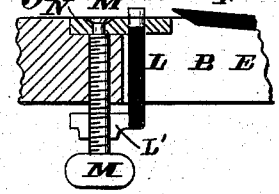
Fig. 5
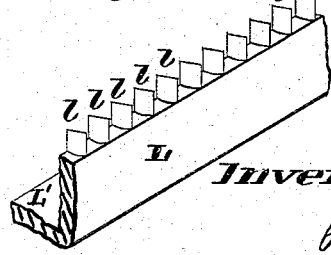
Fig. 6
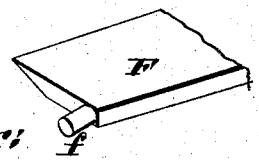
Fig. 7
Attest:
Edw. E. Israel.
Wm. J. Sayers
Inventor;
Peter J. Dames
By Knight Bros.
Attys.

United States Patent Office.

PETER J. DAMES, OF ST. LOUIS, MISSOURI.

MACHINE FOR CUTTING VEGETABLES.

SPECIFICATION forming part of Letters Patent No. 291,305, dated January 1, 1884.

Application filed July 19, 1883. (No model.)

*To all whom it may concern:*

Be it known that I, PETER J. DAMES, of the city of St. Louis, in the State of Missouri, have invented certain new and useful Improvements in a Machine for Cutting Cabbage, &c., of which the following is a full, clear, and exact description, reference being had to the accompanying drawings, forming part of this specification.
This is a machine for cutting cabbage, scoring or partly cutting vegetables, and for cutting roots into slices or strips.

Reference is made to the claim for statement of invention.
Figure 1 is a top view, showing the cabbage-hopper in operation. Fig. 2 is a side view, with part broken away. Fig. 3 is a longitudinal section at 3 3, Fig. 4. Fig. 4 is a top view, with the root-cutting hopper in place for use. Fig. 5 is an enlarged detail section, showing the scoring-tool; and Fig. 6 is a perspective view of part of same. Fig. 7 is a detail perspective view of part of one of the knives.
A is a shallow box having sides B and ends C. Upon the sides are secured metal strips D, serving as guides for the hoppers supporting them and keeping their lower edges clear of the cutters. In the bottom of the box A is a lozenge-shaped aperture, E, in whose upper part are placed the oblique knives F. On the ends of the knives are pivots $f$, upon which they may be turned to lift or depress the edge, to cause them to cut thicker or thinner slices from the article passing over them. The pivots $f$ are at or near the back of the knives.

To adjust the knives and hold them in position, I use set-screws G and H, that turn in screw-sockets of the side bars, and whose points bear against the under and upper sides of the knives, respectively.

I is the hopper to contain the cabbage which is being cut. This hopper has at the corners guide-plates $i$, which have open slots fitting the edges of the guide-strips D, so that the hopper is carried steadily in as it is moved forward and backward over the knives F. It will be seen that the three points of bearing at each end of the knife will cause it to be held very firmly in position, while the construction allows its easy and wide adjustment.

J is a smaller hopper, that is intended more especially for use in cutting roots. To this are attached bars $j$, whose ends are slotted to fit the guide-strips D, to carry the hopper.

K is a follower, to hold hold down the contents of the hopper or box against the cutters.

$j'$ are studs upon the inside of the hopper, to arrest the downward movement of the follower before it comes in contact with the cutters or knives.

I will now describe the apparatus for giving the scores or transverse cuts to the roots before the slicing is done by the knives F.

L is a bar having at the upper edge a series of knives, $l$, that may be made to project above the bottom board, A', of the box A, or may be drawn down, so as to be beneath the top of said board. In the former case the knives score the root as it passes over in the movement of the hopper J, and in the latter case the knives do not come in contact with the root. The knives $l$ are of course parallel with each other and with the sides B of box A. The plate L is vertically adjustable in a guide-slot, for the purpose specified. This adjustment is made by thumb-screws M, that turn in the guide-plate N, and which screw in the flange L' of the plate L, so that by turning the screws the knife-plate is adjusted as aforesaid.

By referring to Fig. 7, it will be seen that the pivot $f$ is not in line with the knife, but is made perpendicular to the side of the plate B, in which the pivot-sockets are made, so that the socket-holes are drilled transversely in the said plate B; but I do not confine myself to the above feature in the pivots $f$, for they may be made in line with the knives, if desired.

Rubber or other springs may be used in place of either the set-screws G or H.

Having described the apparatus, what I claim therein as new and of my invention is—

1. In a vegetable-cutter, the knives having pintles extending from their rear corners, in combination with a frame having set-screws, the pintles having bearing in the frame to hinge the knives thereto, and the set-screws bearing against the upper and under sides of the knives, the upper set-screws working over the under set-screws.

2. In a vegetable-cutter, the ⌐-bar formed at top with scoring-knives and at bottom with a flange, thumb-screws working through said flange, and a slotted plate for the knives to work through, and in which the thumb-screws work, in combination with a board through which the knife-bar is adjusted, to conceal, and also fully or partly expose, the knives, as set forth.

3. In a vegetable-cutter, the combination of the hinged and adjustable slicing-knives and the ⌐-bar having vertical knives adjustable vertically in relation to the slicing-knives for scoring, or to cut strips, as set forth.

4. The combination, in a vegetable-cutter, of the slicing-knives F, having pintles at their rear corners hinged to the frame, set-screws G H, bearing against opposite sides of the knives, the bar L, having vertical scoring-knives $l$, and horizontal flange L', and the thumb-screws M, to adjust the scoring-knives in front of or beneath the slicing-knives, as set forth.

PETER J. DAMES.

Witnesses:
SAML. KNIGHT,
EDW. E. ISRAEL.